United States Patent [19]
Bedarida

[11] Patent Number: 6,049,854
[45] Date of Patent: Apr. 11, 2000

[54] SYSTEM AND METHOD FOR SHARING PHYSICAL MEMORY AMONG DISTINCT COMPUTER ENVIRONMENTS

[75] Inventor: Alessandro Bedarida, Santa Clara, Calif.

[73] Assignee: VLSI Technology, Inc., San Jose, Calif.

[21] Appl. No.: 08/853,288

[22] Filed: May 9, 1997

[51] Int. Cl.[7] .............................. G06F 12/14; G06F 12/10
[52] U.S. Cl. ......................... 711/153; 711/151; 711/206; 711/211; 711/220
[58] Field of Search .................................. 711/147, 173, 711/202, 203, 153, 151, 158, 211, 220, 206

[56] References Cited

U.S. PATENT DOCUMENTS

| | | | |
|---|---|---|---|
| 4,722,048 | 1/1988 | Hirsch et al. | 709/102 |
| 4,827,406 | 5/1989 | Bischoff et al. | 711/153 |
| 5,528,768 | 6/1996 | Bechstein et al. | 711/147 |
| 5,584,017 | 12/1996 | Pierce et al. | 711/146 |

*Primary Examiner*—Hiep T Nguyen
*Attorney, Agent, or Firm*—Wagner, Murabito & Hao LLP

[57] ABSTRACT

Two or more operating systems to share a same physical memory while operating simultaneously within a hybrid computer system, without requiring modifications to the program code of the operating systems or application programs. One embodiment of the present invention contains circuitry that is located between the operating systems and the physical memory within the hybrid computer system. In operation, these circuits receive a memory request for one of the operating systems together with the specific memory address requested and a signal indicating which operating system originated the memory access request. The circuit determines which operating system the memory access request is performed on behalf of. If the memory request is performed on behalf of predetermined first operating system, the received memory address is translated and sent to the physical memory of the computer system. This translation of the physical address is transparent to the first operating system. If a memory access request is detected for the second operating system, the present invention does not perform any address translation and the original memory address is forwarded to the physical memory. The present invention is able to detect memory access requests that are for a particular operating system by: 1) accesses that originate from the CPU where the operating system is running; and 2) accesses that originate from a peripheral or other external device but are performed on behalf of the particular operating system.

22 Claims, 11 Drawing Sheets

SYSTEM AND METHOD FOR SHARING PHYSICAL MEMORY AMONG DISTINCT COMPUTER ENVIRONMENTS

TECHNICAL FIELD

The present invention relates to the field of computer operating systems. More specifically, the present invention relates to allowing two or more computer operating systems to reside and operate within a same computer system while using the same physical memory unit within the computer system.

BACKGROUND ART

A major component within a computer system is the central processing unit (processor). The processor includes the circuitry which controls the interpretation of computer instructions and their execution within the computer system. An operating system is also found within a computer system. The operating system is the software that controls the execution of computer programs and performs computer resource allocation and file management, among other tasks, within the computer system. Furthermore, operating systems are designed and built specifically around the type of processor and other supporting circuitry that are contained within the computer system.

Today, there exists many types of recognized operating systems for the computer market. One major type of operating system is the Apple Macintosh operating system (MacOS), for example, and another is the Microsoft Windows operating system (Windows OS). Each operating system is designed and configured to optimally perform on a specific type of processor. For example, the MacOS operates on an Apple PowerPC processor while the Windows OS operates on an Intel Pentium processor. It is well known within the computer industry that commercial computer software sold to the public is specifically developed to operate with a particular type of operating system. To offer greater software usage versatility within a single computer system, manufacturers have recently combined these two operating systems within a hybrid computer system platform.

Within the computer industry, there are prior art systems used to combine two or more operating systems within a hybrid computer system, but each system has disadvantages. The first prior art system used to combine two or more operating systems within one computer system designates one operating system as the "master" operating system while the other operating system is the "slave." The slave operating system runs within the master operating system which controls the slave operating system. For instance, the master operating system determines what resources (e.g., memory locations) will be allocated to itself and to the slave operating system. This first prior art system is shown in FIG. 1A.

Figure 1A:
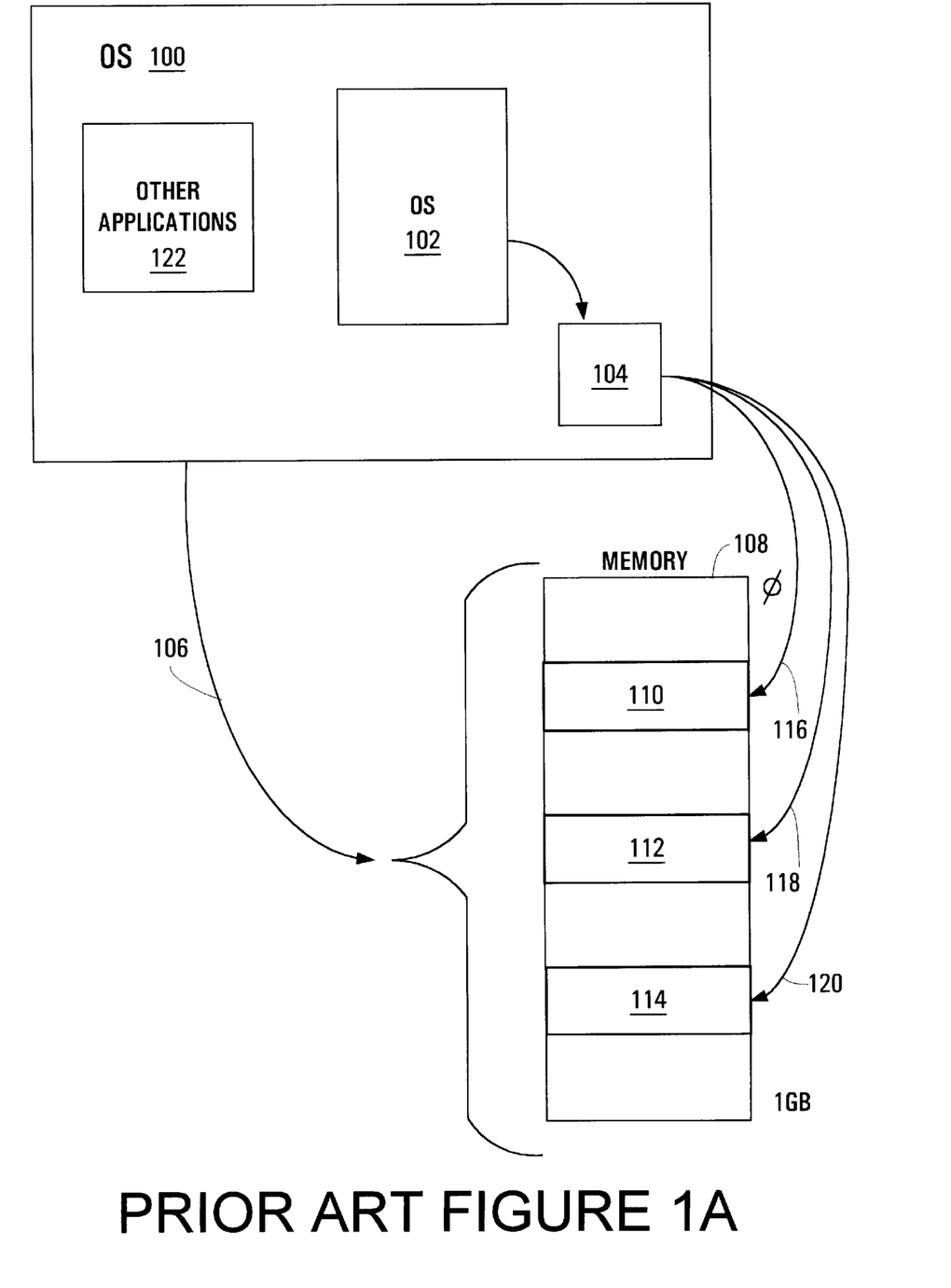
FIG. 1A is a block diagram illustrating a prior art system of designating master and slave operating systems associated with allowing two or more operating systems to function simultaneously within a computer system.

With reference to FIG. 1A, prior art system 5 designates one operating system 100 as the master operating system while the other operating system 102 is the slave operating system. Other applications 122 and slave operating system 102 operate within master operating system 100. Master operating system 100 controls slave operating system 102 and also determines which resources slave operating system 102 is allowed to use. Slave operating system 102 is treated just as another application program. Master operating system 100 has complete access and control over physical memory unit 108, as represented by arrow 106. Controller 104 is a subcomponent of master operating system 100. Master operating system 100 uses controller 104 to restrict the access slave operating system 102 has to physical memory unit 108. Arrows 116–120 represent slave operating system 102 having access to separate blocks of memory 110–114 only through controller 104, which is controlled by master operating system 100.

The main disadvantage associated with prior art system 5 of FIG. 1A is that it requires modifications to be made to the software code of both operating systems so that they operate correctly together. For instance, the software code of master operating system 100 needs to be modified so that it can control slave operating system 102. This modification is required since slave operating system 102 is more complex than other applications 122 that run within master operating system 100. Furthermore, the software code of slave operating system 102 also needs to be modified because typically an operating system is not written or developed to be a slave program within another operating system.

Another disadvantage of prior art system 5 of FIG. 1A is that if only one processor is used to implement two operating systems, it results in slower operations because the single processor must perform emulation of the other operating system running within it. Therefore, it would be advantageous to provide a system that allows two or more operating systems to reside and operate within the same computer system and share the same physical memory unit without exhibiting the disadvantages associated with system 5. The present invention provides these advantages.

A second prior art system used to allow two or more operating systems to reside and operate within a hybrid computer system while sharing the same physical memory unit. This system specifically designates sections of the available physical memory to each operating system. One operating system is located at the base address (zero) of the address range within the physical memory, while the other operating system is located elsewhere within physical memory. This second prior art system is shown in FIG. 1B.

Figure 1B:
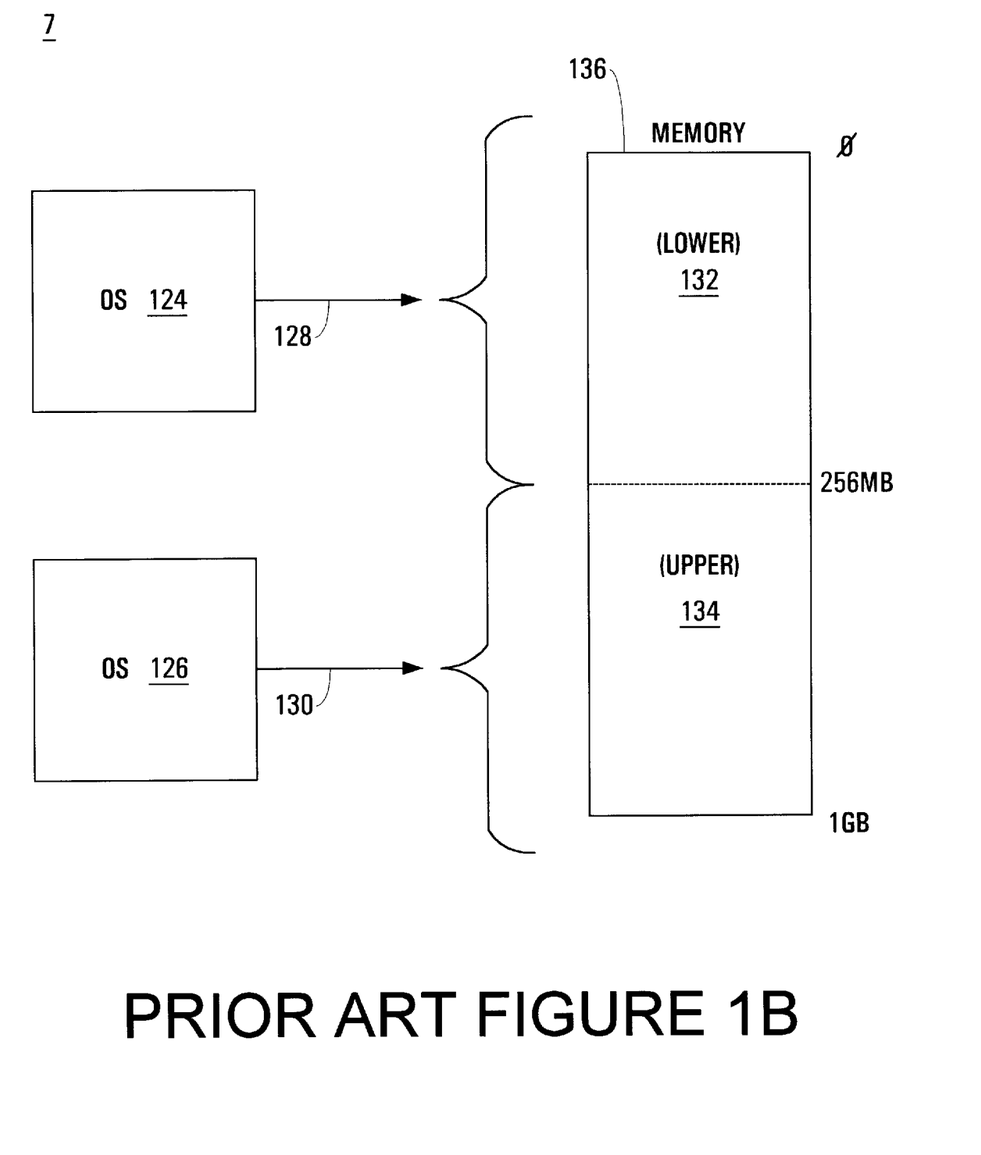
FIG. 1B is a block diagram illustrating a prior art system of partitioning physical memory between operating systems of a computer system.

With reference to FIG. 1B, prior art system 7 designates sections of the available physical memory 136 of the computer to the two operating systems. Physical memory unit 136 is divided into lower address memory block 132 and upper address memory block 134. Operating system 126 only has direct access and control of upper address memory block 134 as represented by arrow 130. Operating system 124 only has direct access and control of lower address memory block 132 as represented by arrow 128. Lower address memory block 132 includes the base address location (zero) of physical memory unit 136.

One disadvantage associated with prior art system 7 of FIG. 1B is that it requires modification of the software code of all the operating systems not located at the base memory address location (zero) of physical memory unit 136. This modification is required because the standard default within the computer industry is to have the operating system use the base address (zero) as its reference point within the computer memory. In other words, an operating system that is off-the-shelf uses the base memory address as the beginning point within memory. Therefore, the complex software code of operating system 126 of FIG. 1B must be modified because it does not have access to lower address block memory 132, which contains the base address location of physical memory unit 136. The modification of operating system 126 would require changing the reference point from the base address location to the 256 megabyte (MB) address location which is the first address space within block memory 134. To make such a modification to the software code of operating system 126 is very difficult to perform because it requires extensive changes to all its code. Given this limitation, it would be advantageous to provide a system to allow two or more operating systems to run simultaneously on a computer while sharing the physical memory that does not require extensive modifications of the software code of the operating systems. The present invention provides this advantage.

Figure 1C:
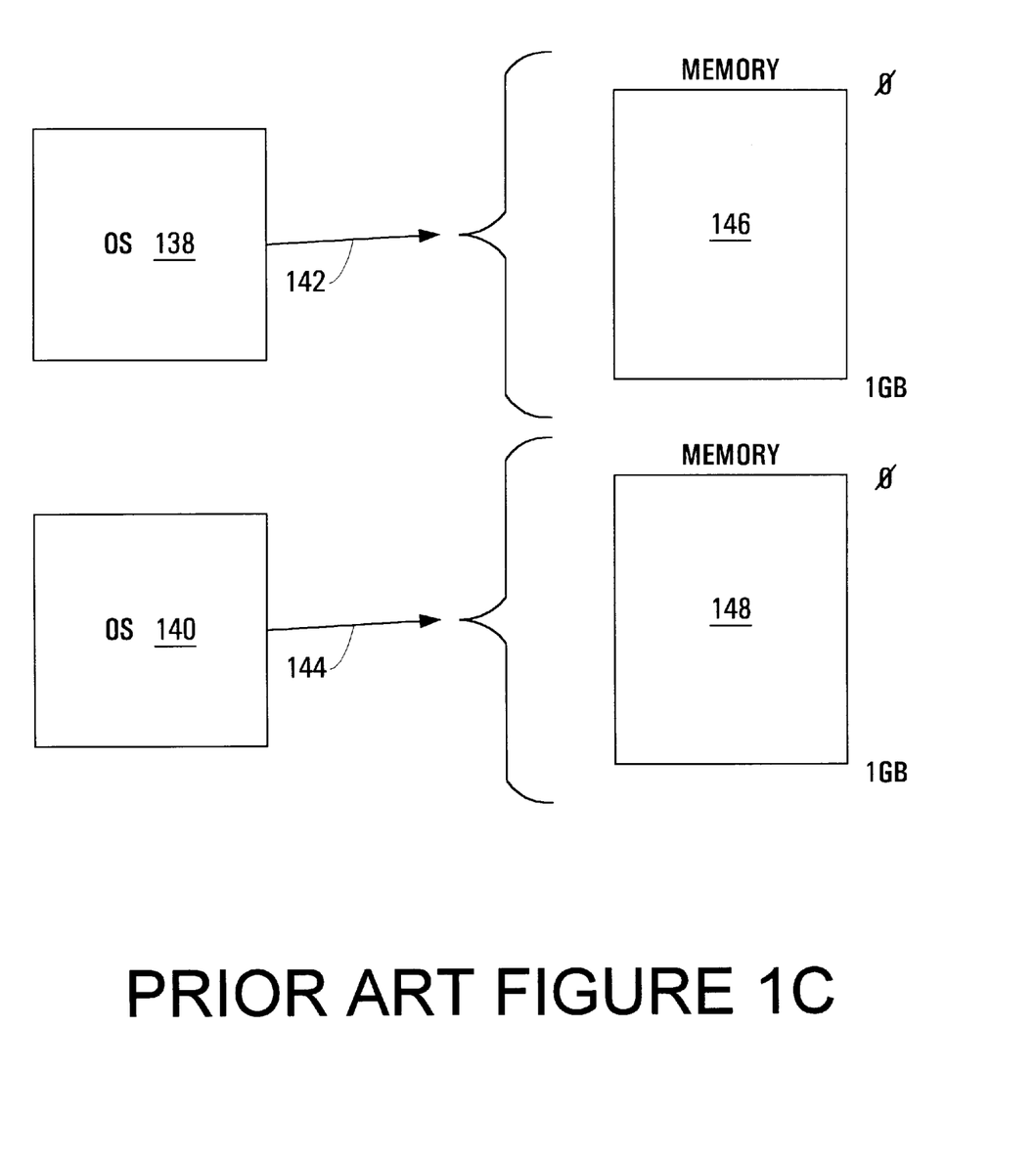
FIG. 1C is a block diagram illustrating a prior art system of having separate respective physical memory units for each operating system within a computer system allowing two or more operating systems to function simultaneously.

A third prior art system used to allow two or more operating systems to run simultaneously on a hybrid computer system is to have separate respective physical memory units for each operating system located within the computer system. One way that this prior art system can be accomplished is by installing an operating system hardware board that interfaces with an expansion slot of a computer containing another type of operating system. FIG. 1C illustrates this third prior art system.

With reference to FIG. 1C, prior art system 9 has separate respective physical memory units for each operating system located within the hybrid computer system. Operating system 138 has direct access and control over physical memory unit 146 as represented by arrow 142. Furthermore, operating system 140 has direct access and control over physical memory unit 148 as represented by arrow 144. Physical memory unit 146 is separate and distinct from physical memory unit 148.

One disadvantage associated with prior art system 9 of FIG. 1C is that only a fraction of the total physical memory located within the hybrid computer system is actually used at any one time. This is because the computer system cannot use both of the separate physical memory units simultaneously. Therefore, much more physical memory (e.g., 2 GB) is consumed by prior art system 9 than is actually ever used in practice. Another disadvantage associated with prior art system 9 is that it is more expensive to fabricate because it requires more memory than would be needed if the operating systems were able to share the same physical memory unit. Another disadvantage is that prior art system 9 does not allow dynamic allocation of the memory between the operating systems. Yet, another disadvantage associated with prior art system 9 is that it requires modifying the physical implementation of the computer system to provide separate memory units. Therefore, it would be advantageous to provide a system that allows two or more operating systems to reside and operate within the same computer system and share the same physical memory unit without exhibiting the disadvantages associated with prior art system 9. The present invention provides these advantages.

Accordingly, the present invention provides a system and method for allowing two operating systems to share the same physical memory address space of a single computer system without requiring modifications to the software code of the operating systems. The present invention provides the above advantages within a computer system that employs two processors.

DISCLOSURE OF THE INVENTION

The present invention allows two or more operating systems to share a same physical memory while operating simultaneously within a hybrid computer system, without requiring modifications to any of the program code of the operating systems or application programs. One embodiment of the present invention contains circuitry that is located between the operating systems and the physical memory within the hybrid computer system. In operation, these circuits receive a memory request for one of the operating systems together with the specific memory address being requested as well as a signal indicating which operating system originated the memory access request. The circuit determines which operating system the memory request is performed on behalf of. If the memory request is performed on behalf of predetermined first operating system, the received memory address location is translated by the present invention. Once translated, the new address is sent to the physical memory unit of the computer system. This translation by the present invention of the physical address location is transparent to the first operating system.

If a memory access request is detected for the second operating system, the present invention does not perform any address translation and the original memory address is forwarded to the physical memory unit. The circuitry of the present invention is able to detect memory access requests that are for a particular operating system by: 1) accesses that originate from the CPU where the operating system is running; and 2) accesses that originate from a computer system peripheral or other external device but are performed on behalf of the particular operating system. Therefore, the present invention allows two or more operating systems to share the same physical memory unit while operating simultaneously within a hybrid computer system, without having to modify any of the operating system software code or application programs.

One embodiment of the present invention provides a computer system having a bus that includes address and data bus portions. First and second operating systems are resident within the computer system and use respectively the first and second virtual memory maps. The first and second operating systems each have page tables for translating virtual addresses of the first and second virtual memory maps into physical addresses of first and second visible physical memory maps, respectively. A memory unit is provided for physically storing information according to a third physical memory map wherein the first and second operating systems share the physical memory unit. A detector circuit is included for detecting a memory access request and for reporting an indication of the operating system for which the memory access request is performed on behalf of. The present invention also includes an address translator circuit coupled to receive the indication from the detector circuit. The address translator circuit is also coupled to receive physical addresses over the bus from the first and second operating systems and is coupled to address the physical memory unit. The address translator translates a physical address of the first physical memory map when the memory access request is performed on behalf of the first operating system. The address translator passes through a physical address of the second physical memory map when the memory access request is performed on behalf of the second operating system.

DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

In the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention operates within a hybrid computer system that allows two operating systems to run simultaneously while sharing the same physical memory unit without the need for modifying the program code of either operating system or application programs. In one embodiment, a first operating system (e.g., Apple Macintosh operating system) runs on one type of processor (e.g., Apple PowerPC processor) while a second operating system (e.g., Microsoft Windows operating system) runs on a different type of processor (e.g., Intel x86 architecture processor). The present invention is able to identify when a memory access request is originated from a specific operating system. A memory access request is originated from a particular operating system if: 1) it originated from the CPU where the operating system is running; or 2) it originated from a computer peripheral, allocated for use by the operating system. In other words, the present invention is able to identify when a memory request originates from a specific operating system or a peripheral device requesting memory access on behalf of a specific operating system. Once the specific operating system of a memory access request is identified, the present invention then allocates different memory space portions of a single physical memory unit to the different operating systems. This is done by translating adress requests of one operating system to one portion of the memory space while allowing memory requests of the other operating system to pass unaltered into another portion of the memory space.

Figure 2A:
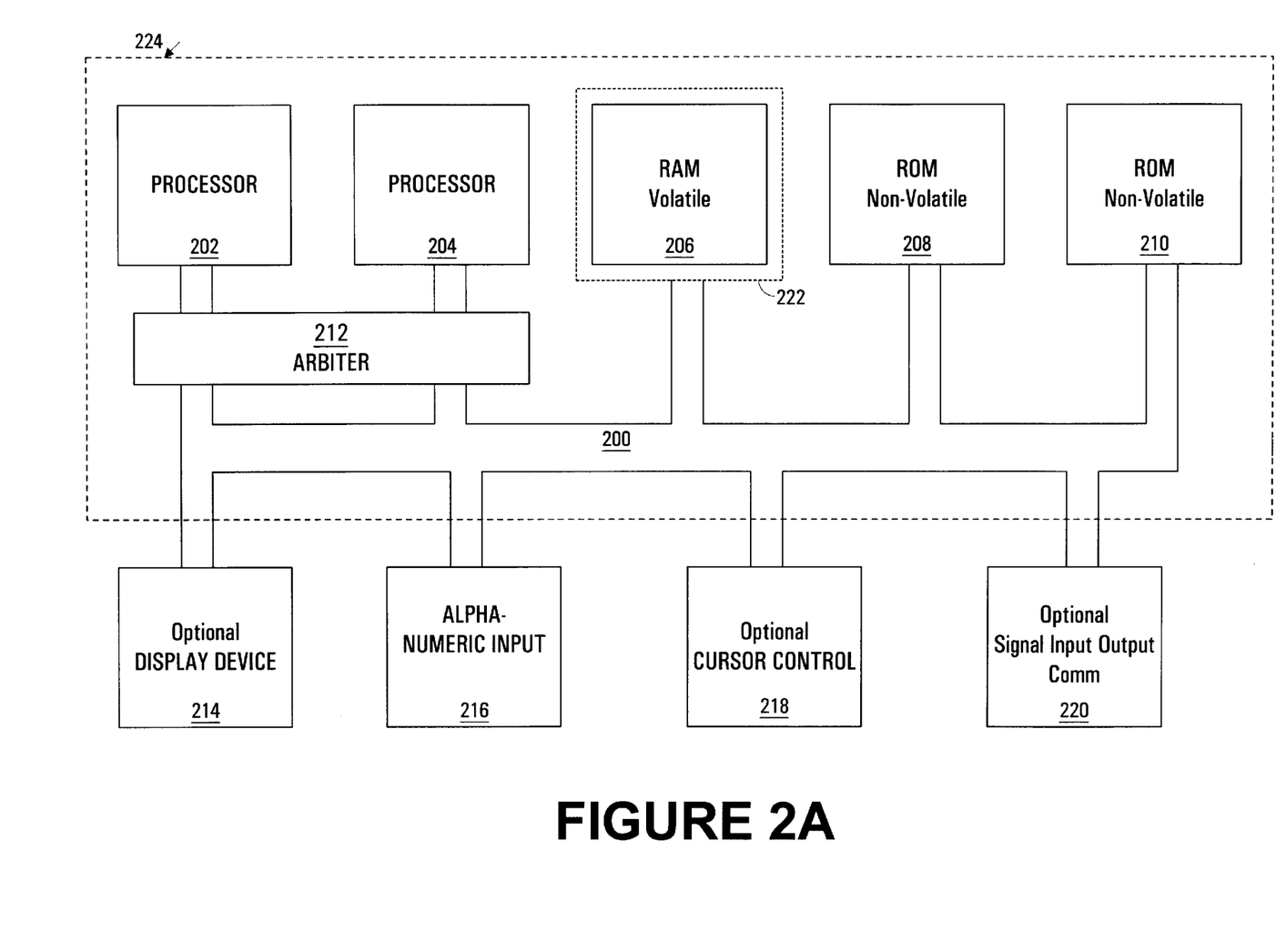
FIG. 2A is a block diagram of a hybrid computer system used in accordance with the present invention.

With reference to FIG. 2A, a block diagram is shown of a hybrid computer system 224 used in accordance with the present invention. In general, hybrid computer system 224 comprises an address/data bus 200 for communicating data and instructions. Address/data bus 200 is coupled to processor 202 and processor 204 for processing information and instructions. A first operating system (e.g., MacOS), not shown in FIG. 2A, runs on processor 202 while a second operating system (e.g., Windows OS), not shown in FIG. 2A, runs on processor 204. Address/data bus 200 is coupled to physical memory subsystem 222 which contains circuitry of the present invention along with computer readable volatile memory unit 206 (e.g., random access memory unit) used for storing information and instructions for processors 202 and 204. Physical memory subsystem 222 allows processors 202 and 204 to share the memory locations within physical memory unit 206. Arbiter 212 is coupled to bus 200 to prevent processors 202 and 204 from issuing concurrent memory access requests under the direction of the first and second operating systems. Address/data bus 200 is also coupled to a computer readable non-volatile memory unit 208 (e.g., read only memory unit) used for storing static data and instructions for processors 202 and 204.

Hybrid computer system 224 of FIG. 2A also optionally includes a computer readable data storage device 210 such as a magnetic or optical disk and disk drive (e.g., hard drive or floppy diskette) coupled with address/data bus 200 for storing information and instructions. An optional display device 214 is coupled to bus 200 for displaying information to the computer user. The display device 214 utilized with hybrid computer system 224 of the present invention can be a liquid crystal device, cathode ray tube, or other display device suitable for creating graphic images and alphanumeric characters recognizable to the user. Hybrid computer system 224 also optionally contains other peripheral devices such as alphanumeric input 216 (e.g., keyboard) coupled to bus 200 which allows the computer user to input instructions and other types of data into hybrid computer system 224. Cursor control 218 (e.g., mouse) is also optionally coupled to bus 200 which allows the user to control where the cursor is located on display device 214. Signal input output communication 220 (e.g., modem) is optionally coupled to bus 200 allowing hybrid computer system 224 to communicate with other computer systems or devices.

Figure 2B:
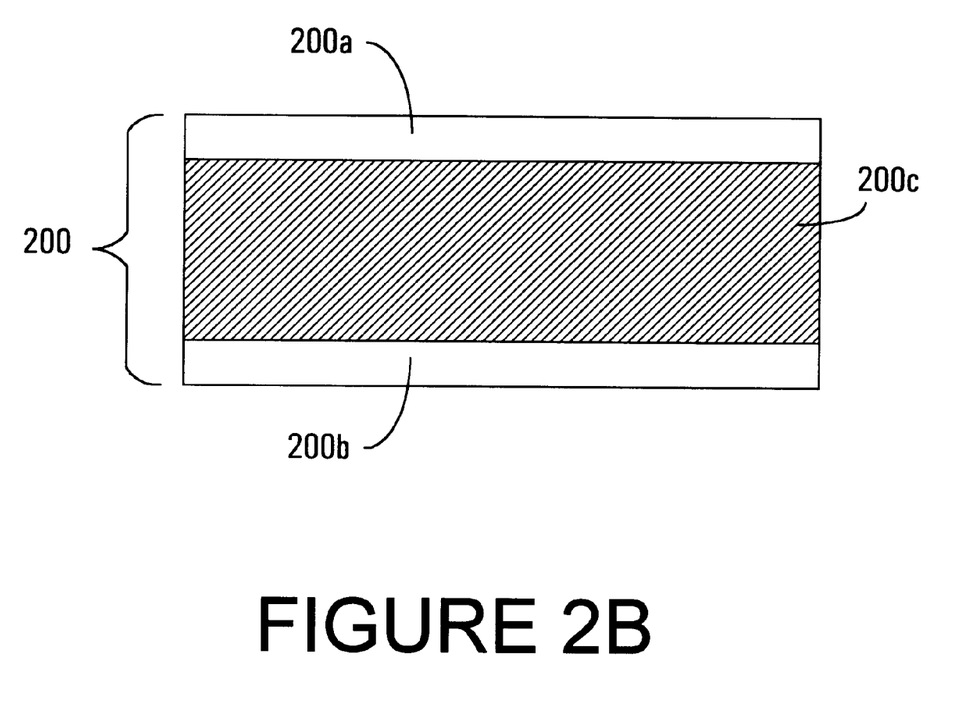
FIG. 2B is a block diagram representing the amount of bus lines within the address/data bus which are shared between the first and second operating systems within the hybrid computer system of the present invention.

With reference to FIG. 2B, a block diagram is shown representing the amount of bus lines within address/data bus 200 which are shared between processors 202 and 204 (FIG. 2A) within hybrid computer system 224. Portion 200c represents the address and data lines of bus 200 shared by processors 202 and 204 to access, among other devices, physical memory subsystem 222 and also non-volatile physical memory 208 under the direction of the first and second operating systems. Portion 200c represents about seventy to eighty percent of the total amount of bus lines located within bus 200. Portion 200a represents the bus lines of bus 200 used only by processor 202, which has the first operating system running on it. Portion 200b represents the bus lines of bus 200 used only by processor 204, which has the second operating system running on it. Another embodiment of address/data bus 200 is to have processor 202 and 204 not share any bus lines of bus 200 resulting in a separate address/data bus for each processor.

Figure 3A:
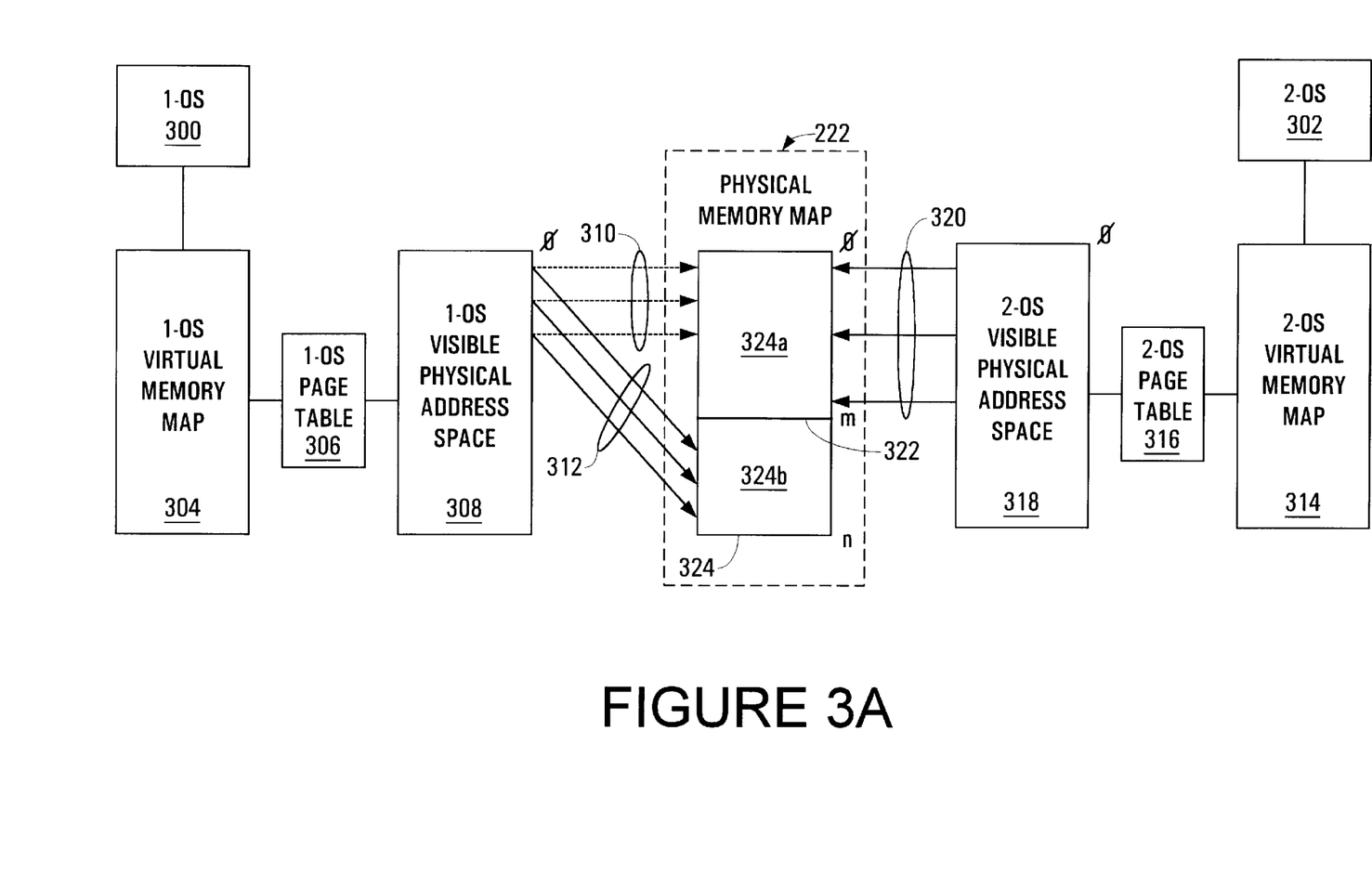
FIG. 3A is a high level diagram illustrating the memory translation and mapping function of the present invention to allow the sharing of the physical memory unit for two or more operating systems which function simultaneously within a hybrid computer system.

FIG. 3A is a high level diagram illustrating the memory translation and mapping functions of the present invention, contained within physical memory subsystem 222, which modifies some or all of the address bits of memory access requests for first operating system 300 to remap its OS-visible physical address space 308. FIG. 3A also illustrates the memory mapping functions of the present invention which directly maps memory access requests of second operating system 302 to physical memory map 324. Physical memory map 324 is a map of the actual physical memory address locations which reside within physical memory unit 206 of FIG. 2A. Within FIG. 3A, physical memory map 324 contains a total of n megabytes of physical memory locations which are divided into physical memory map portions 324a and 324b. Physical memory map portion 324a includes m megabytes of physical memory locations which are allocated to second operating system 302. Physical memory map portion 324b includes of (n–m) megabytes of physical memory locations which are allocated to first operating system 300.

When first operating system 300 of FIG. 3A uses an address from its virtual memory map 304 to perform an operation, page table 306 of first operating system 300 finds the OS-visible physical address of space 308 that corresponds to the virtual address used by first operating system 300. First operating system 300 presents the corresponding OS-visible physical address of space 308 to physical memory subsystem 222 to access the data stored within physical memory map 324. Physical memory subsystem 222 of the present invention provides the translation between OS-visible physical memory space 308 and physical memory map 324. The present invention, contained within physical memory subsystem 222, receives and translates addresses of OS-visible physical address space 308 if they are directed toward a predetermined operating system (e.g., first operating system 300). Since OS-visible physical address space 308 is used by first operating system 300, the present invention receives and translates addresses of OS-visible physical address space 308 into a new memory address located within physical memory map portion 324b, represented by arrows 312. If the present invention did not perform this translation, addresses of OS-visible physical address space 308 would directly map into physical memory map portion 324a as represented by dashed horizontal mapping arrows 310.

When second operating system 302 of FIG. 3A uses an address from its virtual memory map 314 to perform an operation, page table 316 of second operating system 302 finds the OS-visible physical address of space 318 that corresponds to the virtual address used by second operating system 302. Second operating system 302 presents the corresponding OS-visible physical address of space 318 to physical memory subsystem 222 to access the data stored within physical memory map 324. Physical memory subsystem 222 of the present invention provides the translation between OS-visible physical address space 318 and physical memory map 324. The present invention, contained within physical memory subsystem 222, receives addresses of OS-visible physical address space 318 and directly maps them to physical memory map 324 as shown by horizontal mapping arrows 320. It is appreciated that addresses of OS-visible physical address space 318 of second operating system 302 have a one-to-one correspondence with the memory addresses located within physical memory map portion 324a. In other words, the address locations within OS-visible physical address space 318 match the actual memory address locations within physical memory map portion 324a. By providing the above memory translations, both operating systems 300 and 302 believe they are accessing a portion of physical memory map 324 having a base offset value of zero. However, the present invention translates those addresses associated with operating system 300 by adding a base offset of m so that data integrity is maintained in physical memory map 324 while being shared by both operating systems.

Figure 3B:
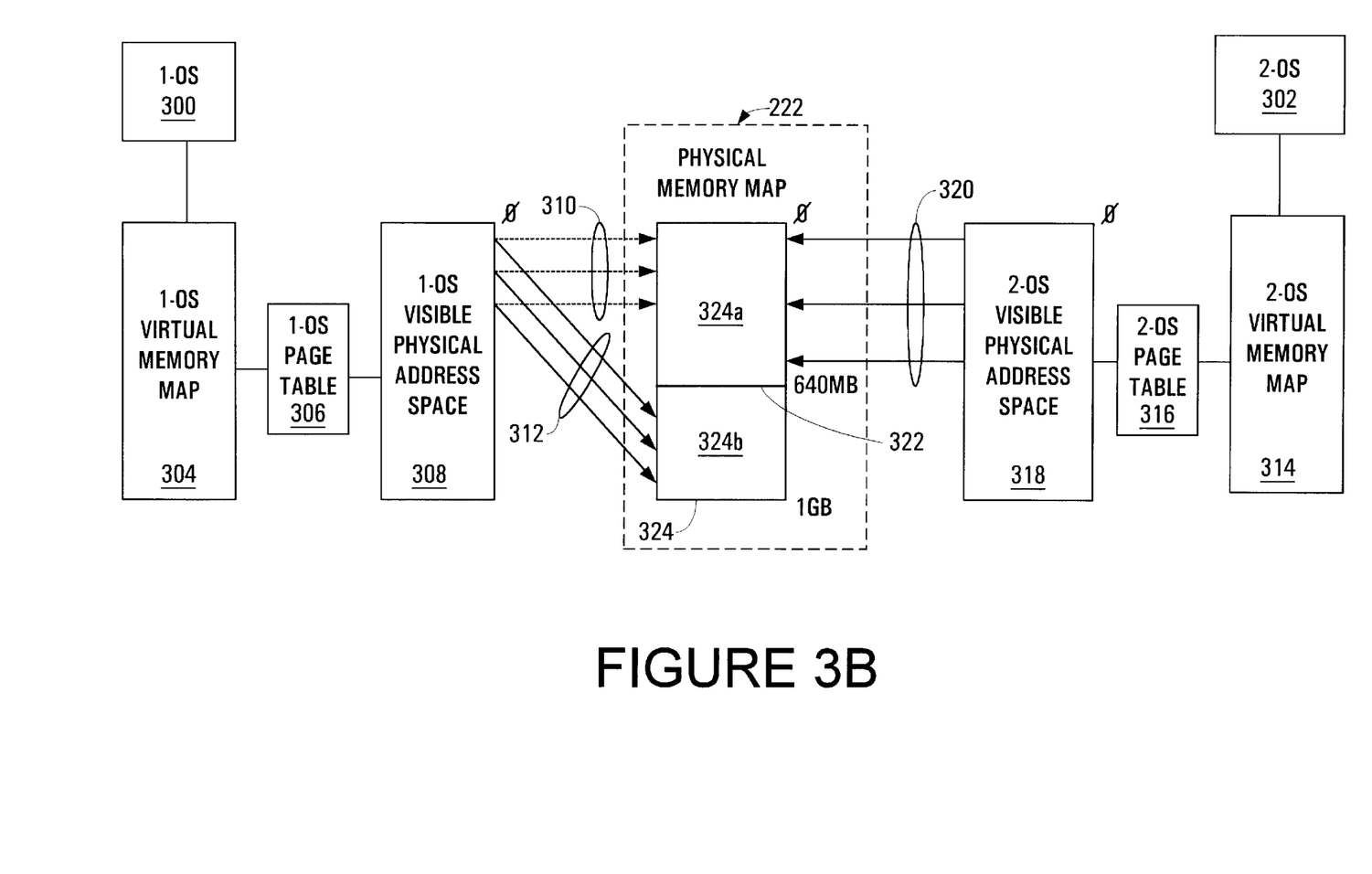
FIG. 3B is a high level diagram illustrating a particular embodiment of the memory translation and mapping functions of the present invention shown in FIG. 3A.

To understand the mapping functions of the present invention better, some values are assigned to variables n and m of FIG. 3A and are shown in FIG. 3B, discussed below.

FIG. 3B illustrates a particular implementation of the present invention. The variable n, which is the total amount of physical memory locations within physical memory map 324, is equal to 1 GB of physical memory. The variable m, which is the amount of physical memory locations within physical memory map portion 324a, is equal to 640 MB of physical memory. Therefore, the amount of physical memory located within physical memory map portion 324b of the embodiment is determined by subtracting 640 MB from 1 GB which results in 384 MB of physical memory. The 640 MB of memory located within physical memory map portion 324a are allocated to second operating system 302 while the 384 MB located within physical memory map portion 324b are allocated to first operating system 300.

If first operating system 300 presents addresses of OS-visible physical address space 308 located between 0 MB and (1 MB−1) to physical memory subsystem 222 (FIG. 2A), the present invention recognizes this and translates the addresses of OS-visible physical address space 308 to their corresponding physical addresses located between 640 MB and (641 MB−1) within physical memory map portion 324b. Moreover, if first operating system 300 presents addresses of OS-visible physical address space 308 located between 150 MB and (160 MB−1) to physical memory subsystem 222 (FIG. 2A), the present invention recognizes this and translates the addresses of OS-visible physical address space 308 to their corresponding physical addresses located between 790 MB and (800 MB−1) within physical memory map portion 324b. It can be seen from these examples that the present invention uses the amount of memory allocated to second operating system 302 (e.g., 640 MB) as a base address offset to translate the OS-visible physical addresses of space 308 received from first operating system 300. Conversely, the present invention does not translate the OS-visible physical addresses of space 318 received from second operating system 302 because those addresses directly match the memory addresses located within physical memory map portion 324a.

In one embodiment, in FIGS. 3A and 3B, the present invention can implement a "fence" feature to guard against memory accesses outside the physical memory portion allocated to a specific operating system. This feature is indicated by fence 322 located within physical memory map 324. An implementation-dependent action (such as raising an exception) is taken whenever a memory access is attempted that is originated by second operating system 302 but is into physical memory map portion 324b or that is originated by first operating system 300 but is into physical memory map portion 324a (e.g., by address "wrap-around"). This "fence" feature would be implemented by a fence circuit that is coupled to both processors 202 and 204 and also bus 200 of FIG. 2A. The fence circuit would be a look-up table that prevents first operating system 300 from requesting access to the physical memory addressed located within physical memory map portion 324a. The fence circuit would also prevent second operating system 302 from requesting access to the physical addresses located within physical memory map portion 324b.

Figure 4A:
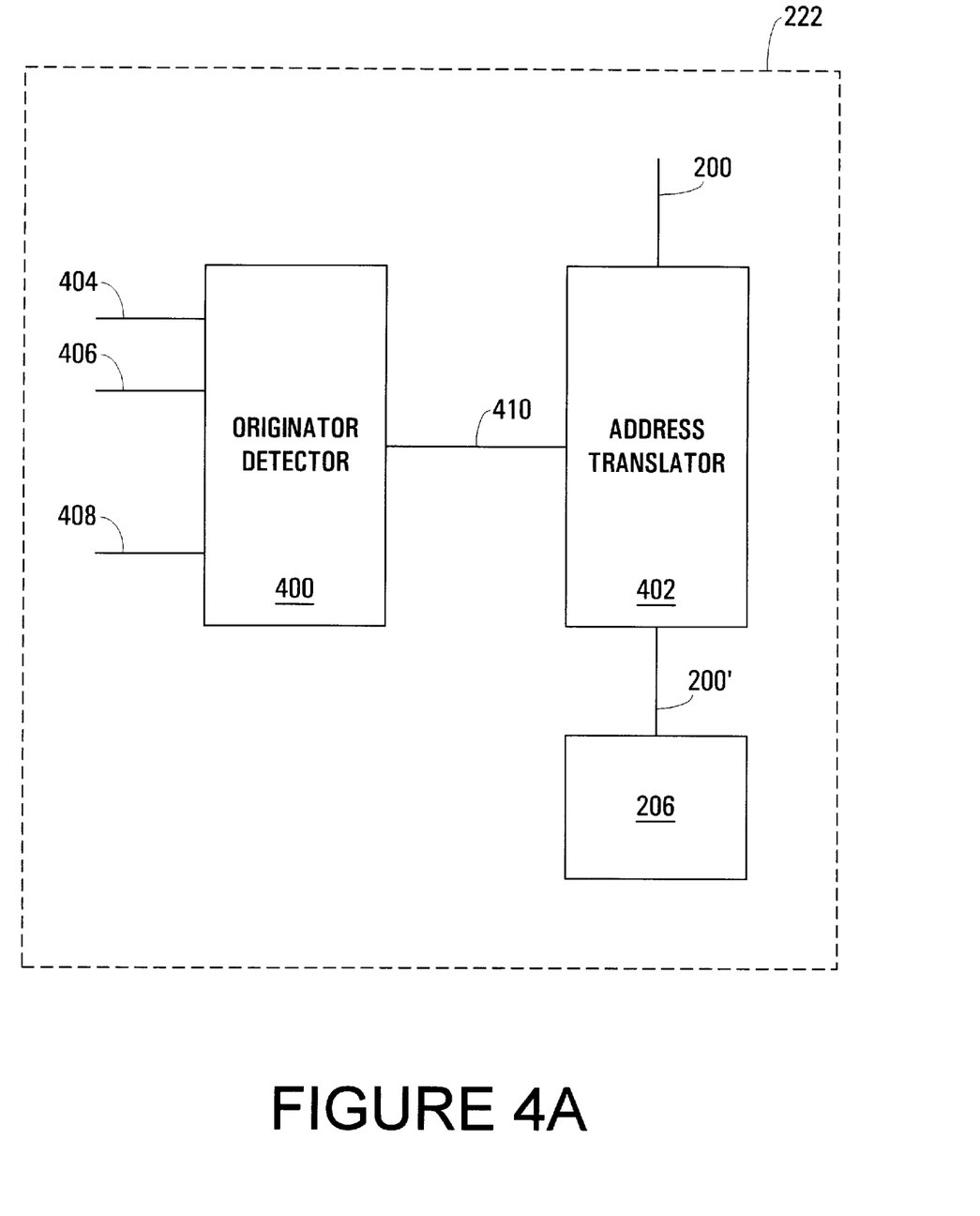
FIG. 4A is a block diagram illustrating the originator detector and address translator circuits of the present invention along with the physical memory unit which are contained within the physical memory subsystem.

FIG. 4A is a block diagram illustrating the originator detector 400 and address translator 402 circuits of the present invention along with physical memory unit 206 all contained within physical memory subsystem 222. As discussed above, first operating system 300 presents a OS-visible physical address of space 308 (FIG. 3A) to physical memory subsystem 222 to access data stored within physical memory map 324 (FIG. 3A), which is a map of the physical memory address locations that reside within physical memory unit 206. To enable first operating system 300 to present this data to physical memory subsystem 222, the processor that first operating system 300 is running on (i.e., processor 202 of FIG. 2A) is coupled to physical memory subsystem 222.

Processor 202 is coupled to address bus 200 and transaction line 406 which are both coupled to physical memory subsystem 222 of FIG. 4A. When first operating system 300 is requesting access to physical memory unit 206 through processor 202, processor 202 sends a transaction start signal over transaction line 406 to originator detector 400 at the same time a physical OS-visible address of space 308 (FIG. 3A) is sent to address translator 402 over address bus 200. If processor 202 was a PowerPC processor, the transactions start signal would be represented by a TS__ signal being asserted on line 406. Moreover, if processor 202 was a x86 processor, the transactions start signal would be represented by an ADS# signal being asserted over transaction line 406. Once originator detector 400 receives the transaction start signal of line 406 and determines that processor 202 sent it under the direction of first operating system 300, originator detector 400 then signals address translator 402 over control line 410 to translate the received OS-visible physical address of space 308. Address translator 402 then translates the received OS-visible physical address of space 308 and transfers the new physical address to physical memory unit 206 over address/data bus 200'.

As discussed above, second operating system 302 presents a OS-visible physical address of space 318 (FIG. 3A) to physical memory subsystem 222 to access data stored within physical memory map 324 (FIG. 3A), which is a map of the physical memory address locations that reside within physical memory unit 206 of FIG. 4A. To enable second operating system 302 to present this data to physical memory subsystem 222, the processor that second operating system 302 is running on (i.e., processor 204 of FIG. 2A) is coupled to physical memory subsystem 222.

Processor 204 is coupled to address bus 200 and transaction line 404 which are both coupled to physical memory subsystem 222 of FIG. 4A. When second operating system 302 is requesting access to physical memory unit 206 through processor 204, processor 204 sends a transaction start signal over line 404 to originator detector 400 at the same time an address of physical OS-visible address space 318 (FIG. 3A) is sent to address translator 402 over address bus 200. Originator detector 400 receives the transaction start signal of line 404 and determines that processor 204 sent it under the direction of second operating system 300. Originator detector 400 then signals address translator 402 over control line 410 not to translate the received OS-visible physical address 318. Address translator 402 then transfers the unaltered received OS-visible physical address 318 to physical memory unit 206 over address/data bus 200'.

To enable computer peripheral devices (e.g., data storage device 210 of FIG. 2A, signal input output communication 220, etc.) coupled to hybrid computer system 224 (FIG. 2A) to request memory accesses to physical memory unit 206 that are directed toward a specific operating system, the peripherals must be coupled to physical memory subsystem 222 of FIG. 4A. When a peripheral requests access to physical memory unit 206, the peripheral sends a "PCI transaction initiator identification (ID)" signal, which indicates which operating system the access is executed on behalf of, over line 408 to originator detector 400 of the present invention. At the same time the PCI transaction initiator ID signal is sent, the peripheral also sends a physical OS-visible address to address translator 402 over address bus 200. Originator detector 400 receives the PCI transaction initiator ID signal of line 408 and determines which peripheral sent it and the operating system on whose behalf the memory access request is directed. Once originator detector 400 determines this information, it then signals address translator 402 over control line 410 whether or not to translate the received OS-visible physical address. As discussed above for first operating system 300 the addresses are translated and for second operating system 302 the addresses are not translated.

Figure 4B:
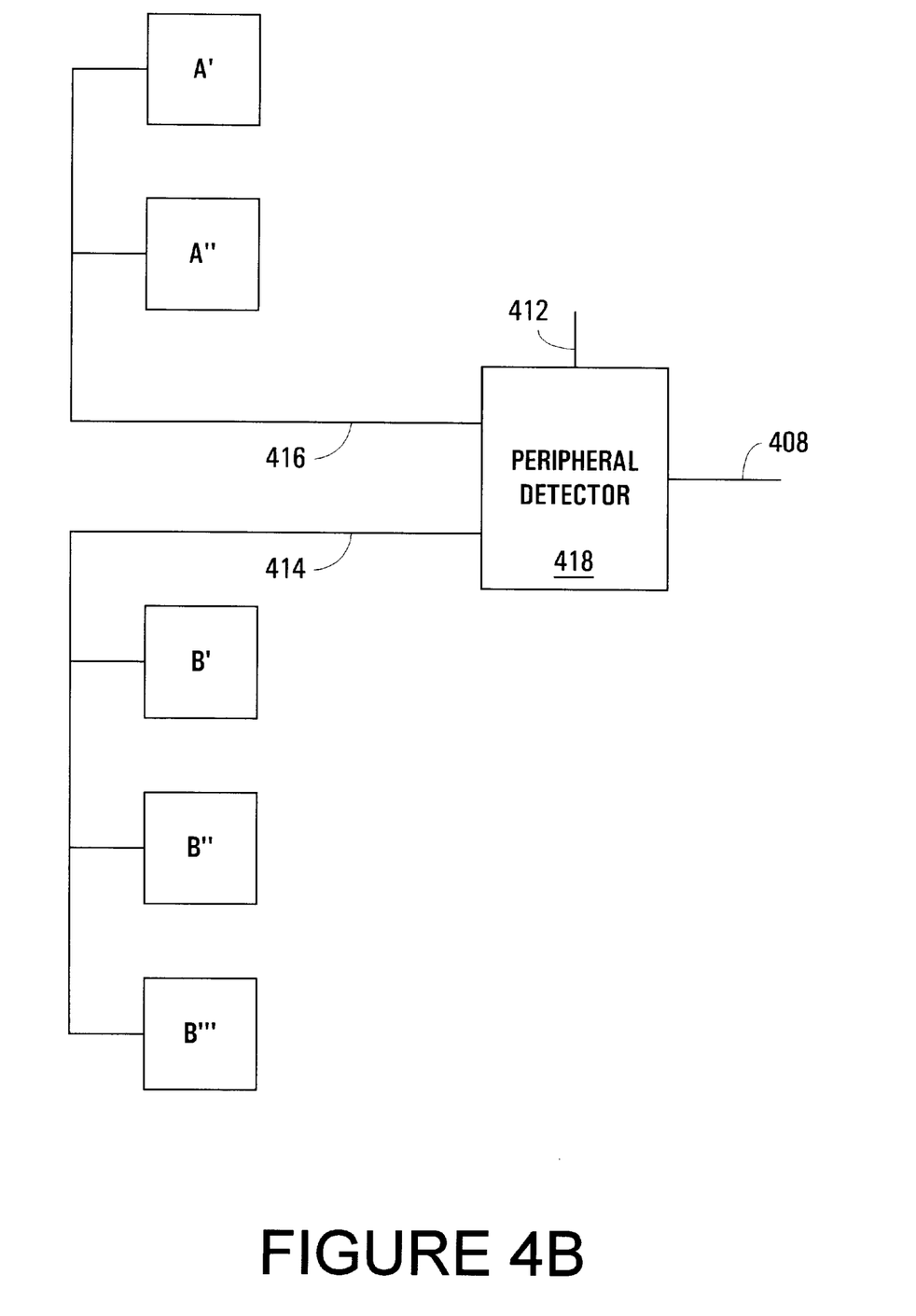
FIG. 4B is a block diagram of computer peripheral devices and a peripheral detector that produces the PCI transaction initiator ID signal that is sent to the originator detector within the present invention.

FIG. 4B is a block diagram of a peripheral detector 418 that produces the PCI transaction initiator ID signal that is sent over line 408. Peripheral detector 418 is shown with two input lines 414 and 416, but can have more input lines. Peripheral detector 418 receives a peripheral transaction start signal (e.g., represented by a FRAME# signal in a PCI architecture convention) over dedicated line 416 from computer peripherals A' and A", which are both dedicated to a specific operating system (e.g., first operating system 300 of FIG. 3A). Peripheral detector 418 also receives a peripheral transaction start signal over dedicated line 414 from computer peripherals B', B", and B'", which are all dedicated to another specific operating system (e.g., second operating system 302 of FIG. 3A). If peripheral detector 418 receives a peripheral transaction start signal over either dedicated line 414 or 416, it sends out an active peripheral signal over signal line 412 at the same time it sends out a PCI transaction initiator ID signal to originator detector 400 (FIG. 4A) over line 408. The active peripheral signal sent over signal line 412 notifies hybrid computer system 224 that a peripheral device is actively requesting access to physical memory unit 206 (FIG. 4A) for arbitration so that only one peripheral can request memory access at a time. The PCI transaction initiator ID signal sent over line 408 allows the originator detector 400 to identify which peripheral is requesting memory access that is directed towards its specific dedicated operating system.

Figure 5:
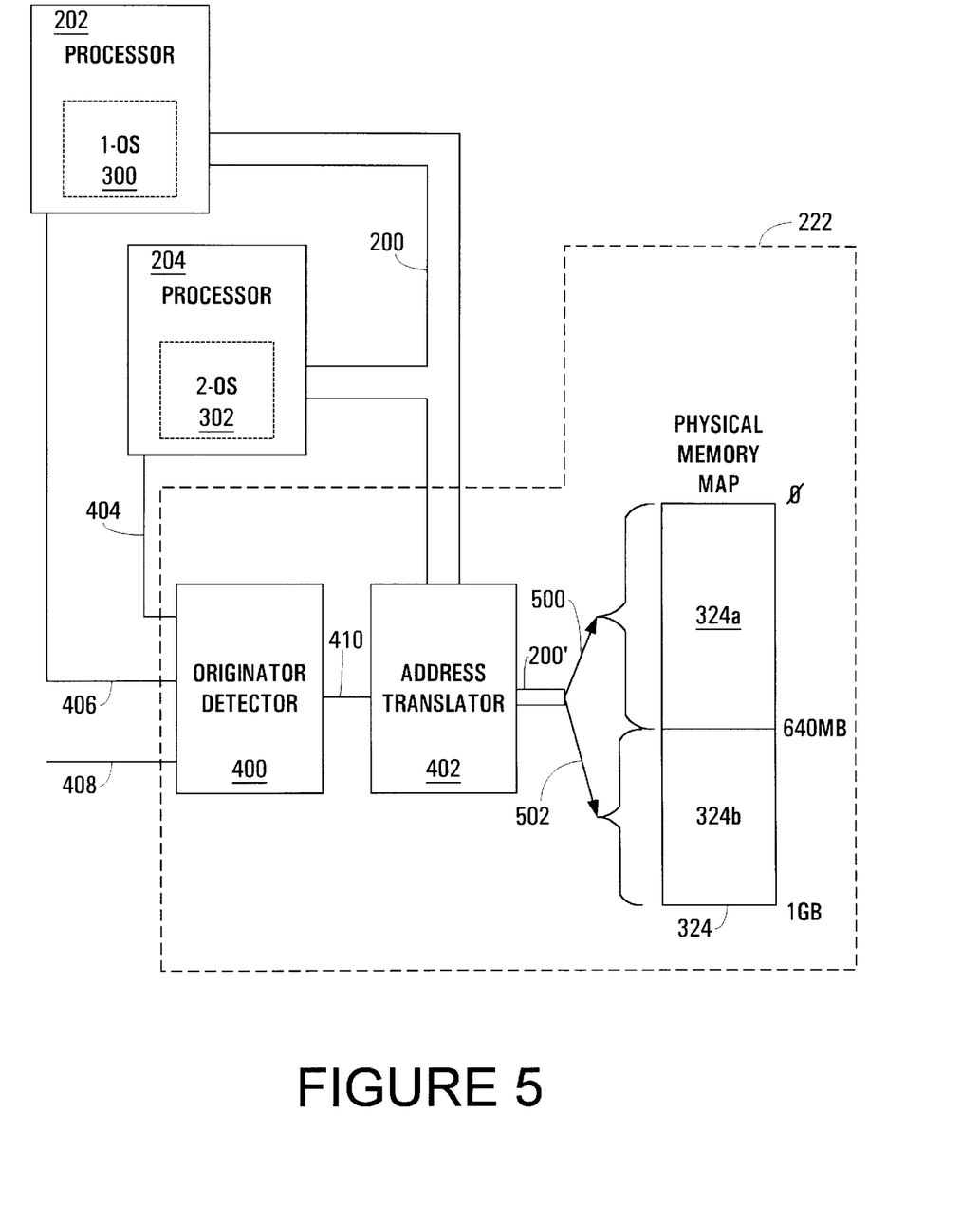
FIG. 5 is a data flow diagram of the operation of the present invention within a hybrid computer system that has two operating systems running on two processors which share the same physical memory unit.

FIG. 5 is a flow diagram of the manner in which the present invention operates within hybrid computer system 224 (FIG. 2A), which has two operating systems running on two processors which share the same physical memory unit. First operating system 300 is running on processor 202 while second operating system 302 is running on processor 204. When first operating system 300 requests access to physical memory map 324, processor 202 sends a transaction start signal to originator detector 400 over line 406 at the same time it sends the OS-visible physical address within space 308 (FIG. 3A) to address translator 402 over address bus 200. Originator detector 400 determines that processor 202 sent the transaction start signal on behalf of first operating system 300 and sends a translate signal to address translator 402 over control line 410. Address translator 402 translates the received OS-visible physical address of space 308 into a new physical address and sends it to physical memory map 324 over address/data bus 200'. The new physical address sent from address translator 402 refers to a memory location within physical memory map portion 324b represented by arrow 502.

When second operating system 302 of FIG. 5 requests access to physical memory map 324, processor 204 sends a transaction start signal to originator detector 400 over line 404 at the same time it sends a OS-visible physical address of space 318 (FIG. 3A) to address translator 402 over address bus 200. Originator detector 400 determines that processor 204 sent the transaction start signal on behalf of second operating system 302 and sends a do not translate signal to address translator 402 over control line 410. Address translator 402 transfers the received OS-visible physical address of space 318 to physical memory map 324 over address/data bus 200'. The OS-visible physical address of space 318 sent from address translator 402 refers to a memory location within physical memory map portion 324a represented by arrow 500.

When a peripheral device (FIG. 4B) requests access to physical memory map 324, the peripheral sends a PCI transaction initiator ID signal to originator detector 400 over line 408 at the same time it sends the OS-visible physical address to address translator 402 over address bus 200. Originator detector 400 determines which operating system the peripheral memory request is directed towards. Once originator detector 400 determines this information, it then signals address translator 402 over control line 410 whether or not to translate the received OS-visible physical address of space 308 or 318, as discussed above for first operating system 300 and second operating system 302.

Figure 6:
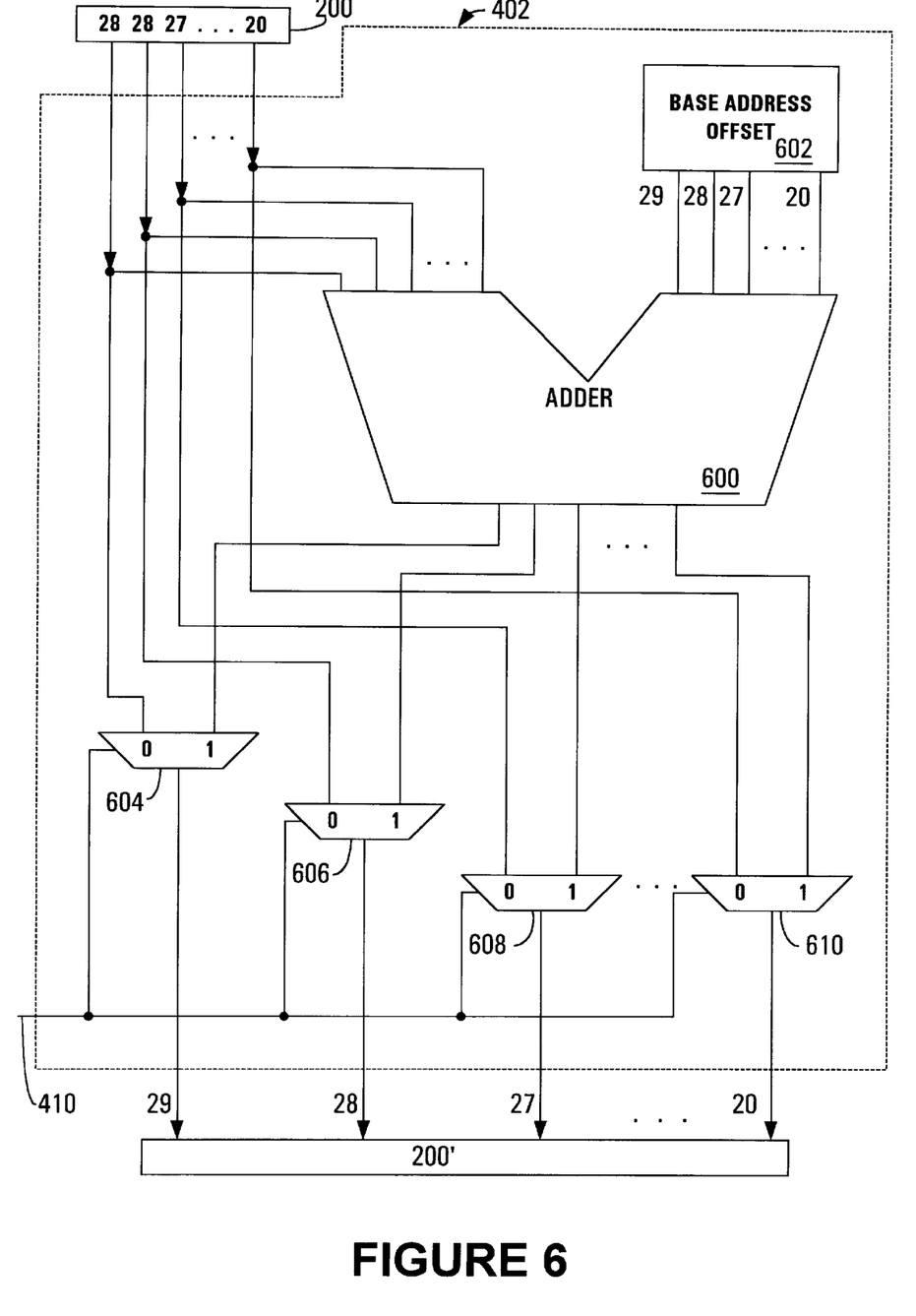
FIG. 6 is a schematic diagram of an embodiment of the address translator of the present invention including input and output signals.

FIG. 6 illustrates a circuit diagram of address translator 402 within the present invention, shown in FIGS. 4A and 5. Address translator 402 is used to translate, as needed, the OS-visible physical address sent by an operating system to access memory locations within physical memory unit 206 (FIG. 4A).

As shown in FIG. 6, adder 600 receives the OS-visible physical address from an operating system over address bus 200 along with base address offset 602 stored within a register. Adder 600 adds each specific address bit position of the received OS-visible physical address to its corresponding address bit position of base address offset 602 and then issues the resultant address bits to multiplexers 604–610. Multiplexers 604–610 each receive a resultant address position bit from adder 600 and the corresponding address position bit from the OS-visible physical address of address bus 200. Also, multiplexers 604–610 each are coupled to control line 410 over which the translate and do not translate signal are sent by originator detector 400 (FIG. 5).

A high signal (e.g., 5 volts) over control line 410 of FIG. 6 represents the case where the received OS-visible physical address needs to be translated because it was sent by processor 202 (FIG. 5), or by a peripheral device under the direction of first operating system 300. So if control line 410 has a high signal on it, multiplexers 604–610 each transfer the translated physical address received from adder 600 to physical memory unit 206 over address/data bus 200'. Conversely, a low signal (e.g., 0 volts) over control line 410 represents the case where the OS-visible physical address is not translated because it was sent by processor 204 (FIG. 5), or by a peripheral device under the direction of second operating system 302. So if control line 410 has a low signal on it, multiplexers 604–610 each transfer the received OS-visible physical address received from address 200 to physical memory unit 206 over address/data bus 200'.

Thus, the present invention provides a system for allowing two or more operating systems to function simultaneously within a hybrid computer system while sharing the same physical memory within the computer system without requiring modifications to the software code of the operating systems or application programs.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A computer system comprising:
   a bus including address and data bus portions;
   first and second operating systems resident within said computer system and using respective first and second virtual memory maps;
   first and second page tables for translating virtual addresses of said first and second virtual memory maps into physical addresses of first and second physical memory maps, respectively;
   a memory unit for physically storing information according to a third physical memory map wherein said first and second operating systems share said memory unit;
   a detector circuit for detecting a memory access request and for reporting an indication of the operating system for which said memory access request is directed; and
   an address translator circuit coupled to receive said indication from said detector circuit, coupled to receive physical addresses over said bus from said first and second operating systems and coupled to address said memory unit, said address translator in response to said indication for translating a physical address of said first physical memory map when said memory access request is performed on behalf of said first operating system and for passing through a physical address of said second physical memory map when said memory access request is performed on behalf of said second operating system.

2. A computer system as described in claim 1 further comprising a first processor coupled to said bus and a second processor coupled to said bus, said first processor for executing said first operating system, said second processor for executing said second operating system and wherein said first and second processors share said address and data portions of said bus.

3. A computer system as described in claim 2 wherein said first processor is of an x86 architecture and wherein said second processor is of a PowerPC processor architecture.

4. A computer system as described in claim 2 further comprising an arbiter circuit coupled to said bus and coupled to said first and second processors, said arbiter circuit for arbitrating memory access requests between said first and second processors such that said first and second operating systems do not issue concurrent memory access requests.

5. A computer system as described in claim 2 wherein said detector circuit is for detecting transaction start signals from said bus that accompany a memory access request, said transaction start signals indicating which processor of said first and said second processors originated said accompanying memory access request.

6. A computer system as described in claim 5 wherein said detector circuit is also for detecting signals, originating from computer system peripherals, that indicate for which operating system a memory access request is to be performed in cases where said memory access request originates from a peripheral of said computer system peripherals.

7. A computer system as described in claim 2 wherein said address translator circuit comprises:

an adder for adding a base address offset value to said physical addresses of said first physical address map;

a multiplexer circuit coupled to receive physical addresses of said second address map, coupled to receive addresses output from said adder and coupled to receive said indication, said multiplexer circuit for supplying addresses of said third physical address map in response to said indication.

8. In a computer system having a first processor and a second processor coupled to a bus including address and data bus portions, and first and second operating systems using respective first and second virtual memory maps, a circuit for sharing memory between said first and second operating systems comprising:

first and second page tables for translating virtual addresses of said first and second virtual memory maps into physical addresses of first and second physical memory maps, respectively;

a memory unit for physically storing information according to a third physical memory map wherein said first and second operating systems share said memory unit;

a detector circuit for detecting a memory access request and for reporting an indication of the operating system for which said memory access request is to be performed; and an address translator circuit coupled to receive said indication from said detector circuit, coupled to receive physical addresses over said bus from said first and second operating systems and coupled to address said memory unit, said address translator in response to said indication for translating a physical address of said first physical memory map when said memory access request is performed on behalf of said first operating system and for passing through a physical address of said second physical memory map when said memory access request is performed on behalf of said second operating system.

9. A circuit as described in claim 8 wherein said first processor executes said first operating system, said second processor executes said second operating system and wherein said first and second processors share said address and data portions of said bus.

10. A circuit as described in claim 9 wherein said first processor is of an x86 architecture and wherein said second processor is of a PowerPC processor architecture.

11. A circuit as described in claim 8 further comprising an arbiter circuit coupled to said bus and coupled to said first and second processors, said arbiter circuit for arbitrating memory access requests between said first and second processors such that said first and second operating systems do not issue concurrent memory access requests.

12. A circuit as described in claim 8 wherein said detector circuit is for detecting transaction start signals from said bus indicating which processor of said first and said second processors originated an associated memory access request.

13. A circuit as described in claim 12 wherein said detector circuit is also for detecting signals, originating from computer system peripherals, that indicate for which operating system a memory access request is directed in cases where said memory access request originates from a peripheral of said computer system peripherals.

14. A circuit as described in claim 8 wherein said address translator circuit comprises:

an adder for adding a base address offset value to said physical addresses of said first physical address map;

a multiplexer circuit coupled to receive physical addresses of said second address map, coupled to receive physical addresses output from said adder and coupled to receive said indication, said multiplexer circuit for supplying addresses of said third physical address map in response to said indication.

15. A circuit as described in claim 8 further comprising a fence circuit coupled to said bus and coupled to said first and second processors, said fence circuit for preventing memory access requests from said first operating system towards said physical address of said second physical memory map and for preventing memory access requests from said second operating system towards said physical address of said first physical memory map.

16. In a computer system having a first processor and a second processor coupled to a bus, a memory unit coupled to bus, and first and second operating systems, a method for sharing said memory unit between said first and second operating systems comprising the steps of:

a) executing said first operating system on said first processor, said first operating system using a first virtual memory map and executing said second operating system on said second processor, said second operating system using a second virtual memory map;

b) translating, respectively, virtual addresses of said first and second virtual memory maps into physical addresses of first and second physical memory maps;

c) detecting a memory access request and reporting an indication of the operating system for which said memory access request is to be performed; and d) generating physical addresses of a third physical memory map with which to access said memory unit, step d) comprising the steps of:

d1) responsive to said indication, translating a physical address of said first physical memory map when said memory access request is performed on behalf of said first operating system; and d2) responsive to said indication, passing through a physical address of said second physical memory map when said memory access request is performed on behalf of said second operating system; and e) responsive to step d), physically storing information into said memory unit according to physical addresses of said third physical memory map allowing said first and second operating systems to share said memory unit.

17. A method as described in claim 16 wherein said first processor is of an x86 architecture and wherein said second processor is of a PowerPC processor architecture.

18. A method as described in claim 16 further comprising the step of arbitrating memory access requests between said first and second processors such that said first and second operating systems do not issue memory access requests concurrently.

19. A method as described in claim 16 wherein step c) comprises the step of detecting transaction start signals of said bus indicating which processor of said first and said second processors originated an associated memory access request.

20. A method as described in claim 19 wherein step c) further comprises the step of detecting signals, originating from computer system peripherals, that indicate for which operating system a memory access request is directed in cases where said memory access request originates from a peripheral of said computer system peripherals.

21. A method as described in claim 16 wherein step d1) comprises the step of adding a base address offset value to said physical addresses of said first physical address map.

22. A method as described in claim 16 further comprising the step of preventing memory access requests from said first operating system towards said physical address of said second physical memory map and preventing memory access requests from said second operating system towards said physical address of said first physical memory map.

* * * * *